US010061920B2

(12) United States Patent
Loubet Moundi

(10) Patent No.: US 10,061,920 B2
(45) Date of Patent: Aug. 28, 2018

(54) SECURE PLATFORM IMPLEMENTING DYNAMIC COUNTERMEASURES

(71) Applicant: GEMALTO SA, Meudon (FR)

(72) Inventor: Philippe Loubet Moundi, La Ciotat (FR)

(73) Assignee: GEMALTO SA, Meudon (FR)

( * ) Notice: Subject to any disclaimer, the term of this patent is extended or adjusted under 35 U.S.C. 154(b) by 161 days.

(21) Appl. No.: 14/888,347

(22) PCT Filed: Apr. 2, 2014

(86) PCT No.: PCT/EP2014/056608
§ 371 (c)(1),
(2) Date: Oct. 30, 2015

(87) PCT Pub. No.: WO2014/187604
PCT Pub. Date: Nov. 27, 2014

(65) Prior Publication Data
US 2016/0070909 A1 Mar. 10, 2016

(30) Foreign Application Priority Data
May 23, 2013 (EP) ..................................... 13305666

(51) Int. Cl.
G06F 21/55 (2013.01)
G06F 21/71 (2013.01)
(Continued)

(52) U.S. Cl.
CPC ............ G06F 21/554 (2013.01); G06F 21/55 (2013.01); G06F 21/566 (2013.01); G06F 21/57 (2013.01);
(Continued)

(58) Field of Classification Search
CPC ........ G06F 21/55; G06F 21/71; G06F 21/566; G06F 21/57; G06F 21/554; G06F 2221/034
(Continued)

(56) References Cited

U.S. PATENT DOCUMENTS

2004/0003286 A1 1/2004 Kaler et al.
2005/0076237 A1* 4/2005 Cohen ..................... G06F 9/468
726/4
2010/0325412 A1* 12/2010 Norrman ................ G06Q 10/06
713/100

FOREIGN PATENT DOCUMENTS

JP 2003-085139 A 3/2003
WO WO2009/047113 A1 4/2009
(Continued)

OTHER PUBLICATIONS

Japanese Office Action dated Jan. 10, 2017 issued in corresponding Japanese Patent Appln. No. 2016-510976, with English translation (5 pages).
Japanese Decision to Grant dated Mar. 28, 2017 issued in corresponding Japanese Patent Appln. No. 2016-510976 (1 page).
Korean Office Action dated Aug. 18, 2016 issued in corresponding Korean Patent Appln. No. 10-2015-7033011 (5 pages).
Korean Notice of Allowance dated Feb. 22, 2017 issued in corresponding Korean Patent Appln. No. 10-2015-7033011 (3 pages).
International Search Report (PCT/ISA/210) dated Jun. 6, 2014, by the European Patent Office as the International Searching Authority for International Application No. PCT/EP2014/056608.
(Continued)

Primary Examiner — Brandon S Hoffman
Assistant Examiner — Nega Woldemariam
(74) Attorney, Agent, or Firm — Buchanan Ingersoll & Rooney PC

(57) ABSTRACT

The present invention relates to a secure platform implementing dynamic countermeasures in relation with the
(Continued)

execution of a code, said secure platform having at least a security sensor, a countermeasure controller and countermeasure means. According to the invention, said countermeasure controller includes at least one security sensor flag able to take at least two sensor flag values depending on the output of the security sensor, a table storing N possible security configuration for the countermeasures, a random generator to generate a random configuration value, a decision function using the sensor flag value and the random configuration value to determine a security configuration in the table to be executed by countermeasure means.

20 Claims, 1 Drawing Sheet

(51) Int. Cl.
*G06F 21/56* (2013.01)
*G06F 21/57* (2013.01)

(52) U.S. Cl.
CPC ........ *G06F 21/71* (2013.01); *G06F 2221/034* (2013.01)

(58) Field of Classification Search
USPC .......................................................... 726/23
See application file for complete search history.

(56) References Cited

FOREIGN PATENT DOCUMENTS

WO         2011/073301 A1     6/2011
WO     WO 2011/073301 A1     6/2011

OTHER PUBLICATIONS

Written Opinion (PCT/ISA/237) dated Jun. 6, 2014, by the European Patent Office as the International Searching Authority for International Application No. PCT/EP2014/056608.

\* cited by examiner

SECURE PLATFORM IMPLEMENTING DYNAMIC COUNTERMEASURES

FIELD OF THE INVENTION

The present invention relates to a secure platform implementing dynamic countermeasures in relation with the execution of a code. More precisely, it concerns such a platform having at least a security sensor able to detect security thread, a countermeasure controller and countermeasure means. More generally, the invention concerns all operating system or piece of code or hardware implementation that need to be executed on secure platform having at least a security sensor.

The invention also pertains to a method to control dynamic countermeasures in relation with the execution of a code.

BACKGROUND OF THE INVENTION

Generally, protecting the entire code execution is too expensive and, in current implementations, the security configuration is fixed by default and it is dependent of the sensitivity of the process executed.

That means, sensitive code like cryptographic operations are well protected but other part of the code are more vulnerable.

If the entire code needs to be protected, the countermeasures will be enabled all the time and the performances will be decreased accordingly.

Increasing countermeasures level in case an attack is detected is also known. It may consist in temporarily freezing the execution of the code or any other known countermeasures. However, such method does not enable any adaptation of the countermeasures.

SUMMARY OF THE INVENTION

The goal of the invention is to avoid performances penalties introduced by software or hardware countermeasures when there is no attack detected and to optimize the countermeasures when an attack is detected.

The present invention thus concerns a secure platform where said countermeasure controller includes:

at least one security sensor flag taking at least two values depending on the outputs from the security sensor, a table storing n possible security configuration for the countermeasures, a random generator to generate a configuration random value, a decision function using the value of the security sensor flag and the configuration random value to determine a security configuration in the table to be executed by countermeasure means.

With the invention, adapted security protections will be enabled only when security risks or alarms are raised. As a consequence, overall performance of the product will be better with the invention. The invention also enables countermeasure to be randomly configured and thus diversified which renders the task of the attacker even more difficult. The size of the configuration table can be adapted to the system and to the security level. The configuration table is scaled accordingly.

According to a particular feature, a default configuration is executed when the security sensor flag is cleared.

This feature enables to keep the security low at any time the sensor flag is cleared. It also enables to fall back to a low security level as soon as the sensor flag is cleared.

Advantageously, the security sensor flag is of semi-persistent kind.

This feature means that the sensor flag is cleared after a given duration without new detection input from the sensor.

It enables the secure platform to adapt its countermeasure configuration to any return to a normal situation without attacks. Advantageously hardware semi-persistent flags constitute the security sensor flag.

According to a particular feature, the semi-persistence is such that security sensor flag is decreased after a given number of consecutive executions without detection of a security thread.

Here the semi-persistence duration is a number of events, i.e. a given number of consecutive executions without detection.

The present invention also relates to a method to control dynamic countermeasures in relation with the execution of a code, said method comprising the following steps:

monitoring a security sensor, modifying the value of at least one security sensor flag depending on the outputs from the security sensor, generating a configuration random value for at least one given value of the security sensor flag, deciding a security configuration for the countermeasures from a table storing n possible security configurations, said decision depending on the value of the security sensor flag and on the configuration random value, executing countermeasures according to the security configuration.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
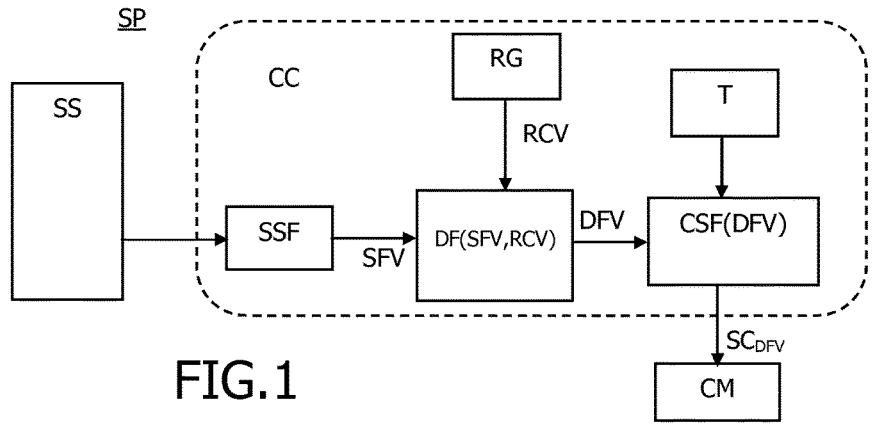
FIG. 1 schematically represents a secure platform of the invention.

The same elements have been designated with the same reference numerals in the different drawings. For clarity, only those elements and steps which are useful to the understanding of the present invention have been shown in the drawings and will be described.

FIG. 1 schematically shows a security platform SP including a security sensor SS and countermeasure means CM. Said security platform SP also comprises at least a countermeasure controller CC having a security sensor flag SSF triggered by the security sensor SS in order to output a sensor flag value SFV thus indicating a potential security risk. This security sensor flag SSF can be hardware or software implemented.

The countermeasure controller CC also includes a table T storing a given number N of possible security configurations SC and a random generator RG to generate a random configuration value RCV. This last value RCV is for instance a number between 1 and N. The random configuration value RCV is provided with the sensor flag value SFV to a decision function DF(SFV,RCV).

This decision function DF uses the sensor flag value SFV and the random configuration value RCV to randomly select a security configuration SC among N possible configurations SC in the table T. For example, as illustrated on FIG. 1, the decision function DF calculates a decision function value DFV sent to a configuration selection function CSF that will select the corresponding security configuration $SC_{DFV}$ in the table and make countermeasure means CM to apply the corresponding countermeasures.

Figure 2:
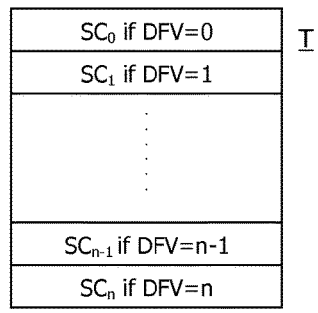
FIG. 2 schematically illustrates the countermeasures' configuration choice depending on a decision function value as defined by the decision function of the invention.

FIG. 2 schematically shows the table T listing the possible security configurations $SC_{DFV}$ chosen in function of the decision function value DFV.

Each security configuration SC advantageously comprises a set of settings: clock setting, hardware counter measure settings, software counter measure settings, voltage range setting etc.

Figure 3:
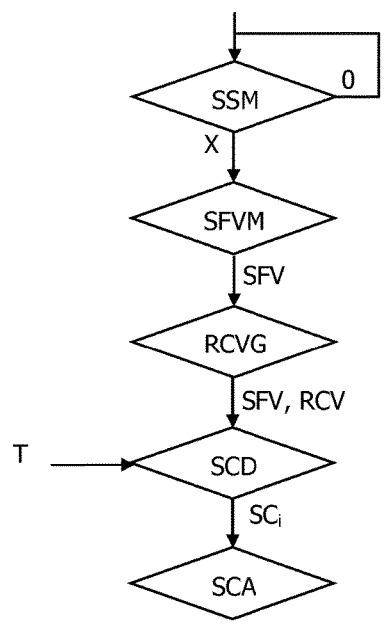
FIG. 3 shows an illustrative flowchart of the method of the invention.

FIG. 3 is a flowchart of the method of the invention. The first step SSM consists in monitoring the security sensor SS. Typically, as long as the output of the sensor is null (case "0" on FIG. 3), the monitoring continues without subsequent actions.

As soon as the sensor's output is not null (case "X" on FIG. 3), a security flag value SFV is produced. Subsequently or simultaneously, a step RCVG of generation of a random configuration value RCV is performed.

This generated value RCV and the security flag value SFV are then used in a security confirmation decision step SCD to determine a selected security configuration $SC_i$. This selection is for instance done in a table T. The selected configuration $SC_i$ is then applied in a security configuration application step SCA.

Consequently, with the invention, if a security issue is detected by the security sensor SS, the configuration used by the secure platform is randomly selected among N possible configurations with a better security level, i.e. configuration having more counter measures than a default one, for instance $SC_0$, but with a lower performance in terms of code execution or in terms of energy required.

Each time the security sensor SS is checked, the configuration of the security can potentially be changed. As the security configuration changes depend on the sensor flag value changes, they are in both ways, by increasing the security or by decreasing it. Decrease is observed as soon as the sensor flag value SFV is returned to a null value by example or as soon as, the security sensor flag SSF being semi-persistent, the sensor flag value is back to its default value. Thus, once the security sensor flag SSF is cleared, the device could run again with a default configuration optimized for performances. In fact, the default configuration, for example $SC_0$, uses the settings needed to achieve the best performance in time for the execution of the code.

With the invention, better performances can be reached as protections will be enabled only in case of an attack. Better security is also reached as the entire software, and not only the sensitive process, could benefit from secure system configuration.

In the above detailed description, reference is made to the accompanying drawings that show, by way of illustration, specific embodiments in which the invention may be practiced. These embodiments are described in sufficient detail to enable those skilled in the art to practice the invention but the detailed description is, therefore, not to be taken in a limiting sense. The scope of the present invention is defined only by the appended claims, appropriately interpreted, along with the full range of equivalents to which the claims are entitled. In particular it will be understood that the use of a table has equivalents in the computer field to store a list if configuration defined typically by security countermeasure settings.

The invention claimed is:

1. A secure platform implementing dynamic countermeasures against malicious attacks in relation with execution of a computer code by the secure platform, said secure platform comprising:
   at least a security sensor configured to detect a security thread;
   a countermeasure controller; and
   a countermeasure means,
   wherein said countermeasure controller includes:
   (i) at least one security sensor flag configured to output at least two sensor flag values depending on the output of the security sensor of the secure platform,
   (ii) a memory comprising a table storing N possible security configurations for the countermeasures, each security configuration, when selected, causes said countermeasure means to apply a corresponding countermeasure relative to the execution of the computer code by the secure platform,
   (iii) a random generator configured to generate a random configuration value, and
   (iv) a selection function using the sensor flag value on a basis of the output of the security sensor of the secure platform and the random configuration value to select a security configuration among the N possible security configurations listed in the table stored in the memory, said security configuration being executed by the countermeasure means during the execution of the computer code by the secure platform.

2. The secure platform according to claim 1, wherein a default configuration is executed when the security sensor flag is cleared.

3. The secure platform according to claim 1, wherein the security sensor flag is of a semi-persistent kind.

4. The secure platform according to claim 3, wherein the semi-persistence is such that the security sensor flag is decreased after a given number of consecutive executions without detection of a security thread.

5. A method to control, by a secure platform, dynamic countermeasures against malicious attacks in relation with execution of a computer code by the secure platform, said method comprising the following steps:
   monitoring a security sensor included in the secure platform,
   modifying a sensor flag value depending on the outputs from the security sensor included in the secure platform,
   generating, by a countermeasure controller of the secure platform, a random configuration value,
   selecting, by the countermeasure controller of the secure platform, a security configuration for the countermeasures from a table stored in a memory of the countermeasure controller, said table storing N possible security configurations, wherein each possible security configuration causes, when selected, a countermeasure means to apply a corresponding countermeasure relative to the execution of the computer code by the secure platform, and wherein said selection depends on the sensor flag value based on the output of the security sensor included in the secure platform and on the generated random configuration value, and executing the countermeasures of the selected security configuration during the execution of the computer code by the secure platform according to the security configuration.

6. The secure platform according to claim 1, wherein the security configuration comprises a set of settings of at least one of a clock setting, hardware countermeasure settings, software countermeasure settings, and a voltage range setting.

7. The secure platform according to claim 2, wherein the security configuration comprises a set of settings of at least one of a clock setting, hardware countermeasure settings, software countermeasure settings, and a voltage range setting.

8. The secure platform according to claim 3, wherein the security configuration comprises a set of settings of at least one of a clock setting, hardware countermeasure settings, software countermeasure settings, and a voltage range setting.

9. The secure platform according to claim 4, wherein the security configuration comprises a set of settings of at least one of a clock setting, hardware countermeasure settings, software countermeasure settings, and a voltage range setting.

10. The secure platform according to claim 1, wherein the selection is triggered each time the security sensor is checked.

11. The secure platform according to claim 2, wherein the selection is triggered each time the security sensor is checked.

12. The secure platform according to claim 3, wherein the selection is triggered each time the security sensor is checked.

13. The secure platform according to claim 4, wherein the selection is triggered each time the security sensor is checked.

14. The secure platform according to claim 6, wherein the selection is triggered each time the security sensor is checked.

15. The secure platform according to claim 1, wherein the generation of a random configuration value is performed subsequently or simultaneously of the output of a not null sensor's output.

16. The secure platform according to claim 2, wherein the generation of a random configuration value is performed subsequently or simultaneously of the output of a not null sensor's output.

17. The secure platform according to claim 3, wherein the generation of a random configuration value is performed subsequently or simultaneously of the output of a not null sensor's output.

18. The secure platform according to claim 4, wherein the generation of a random configuration value is performed subsequently or simultaneously of the output of a not null sensor's output.

19. The secure platform according to claim 6, wherein the generation of a random configuration value is performed subsequently or simultaneously of the output of a not null sensor's output.

20. The secure platform according to claim 10, wherein the generation of a random configuration value is performed subsequently or simultaneously of the output of a not null sensor's output.

* * * * *